Patented Mar. 24, 1953

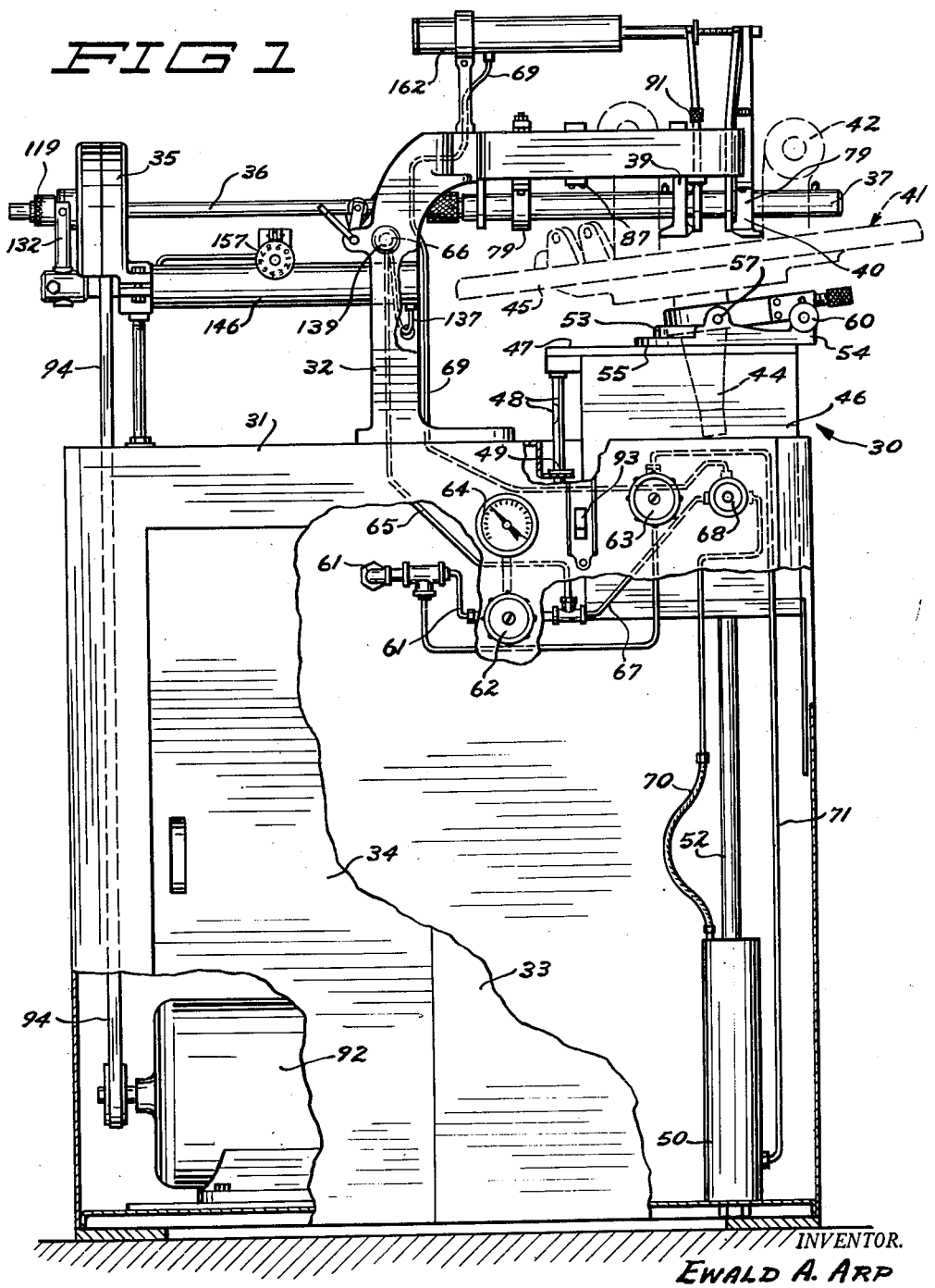

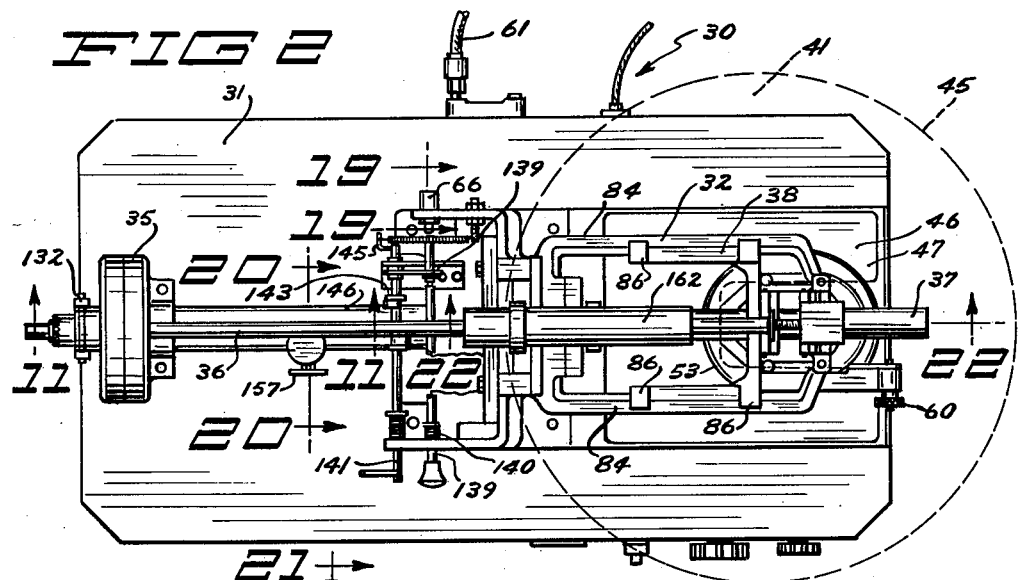
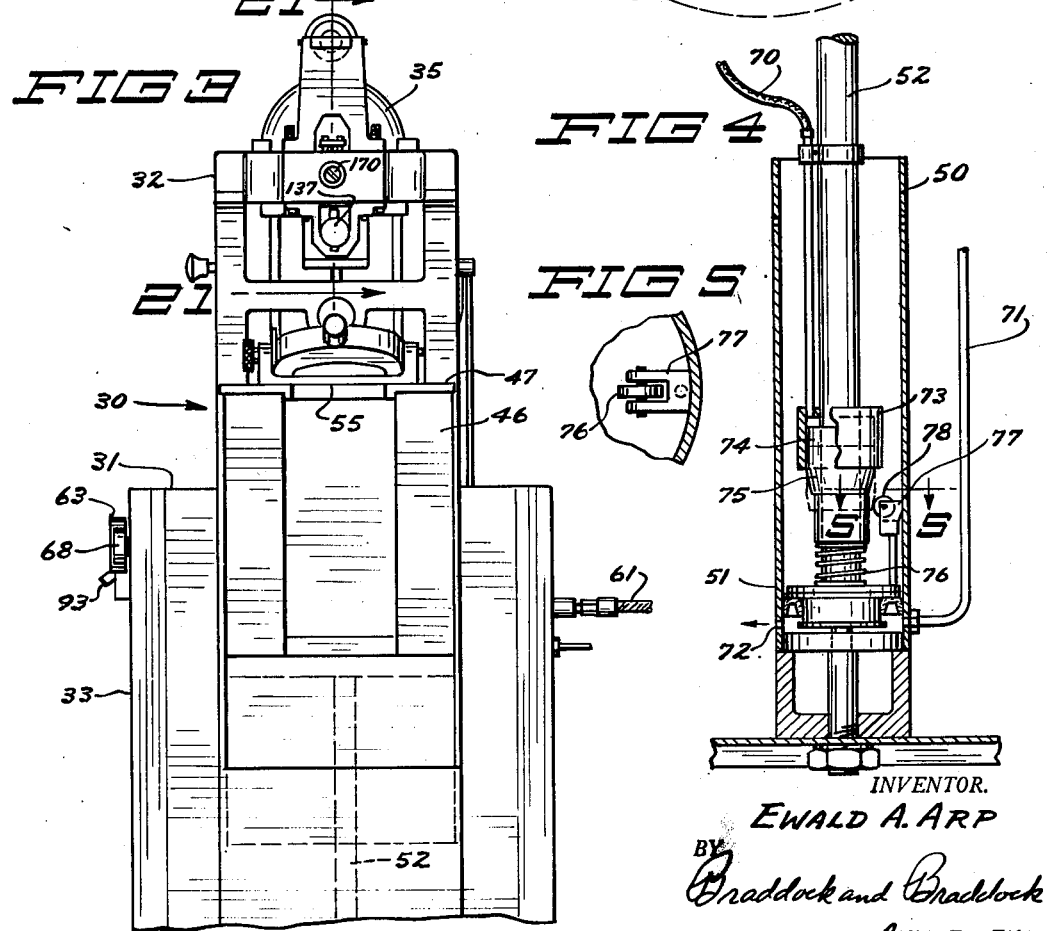

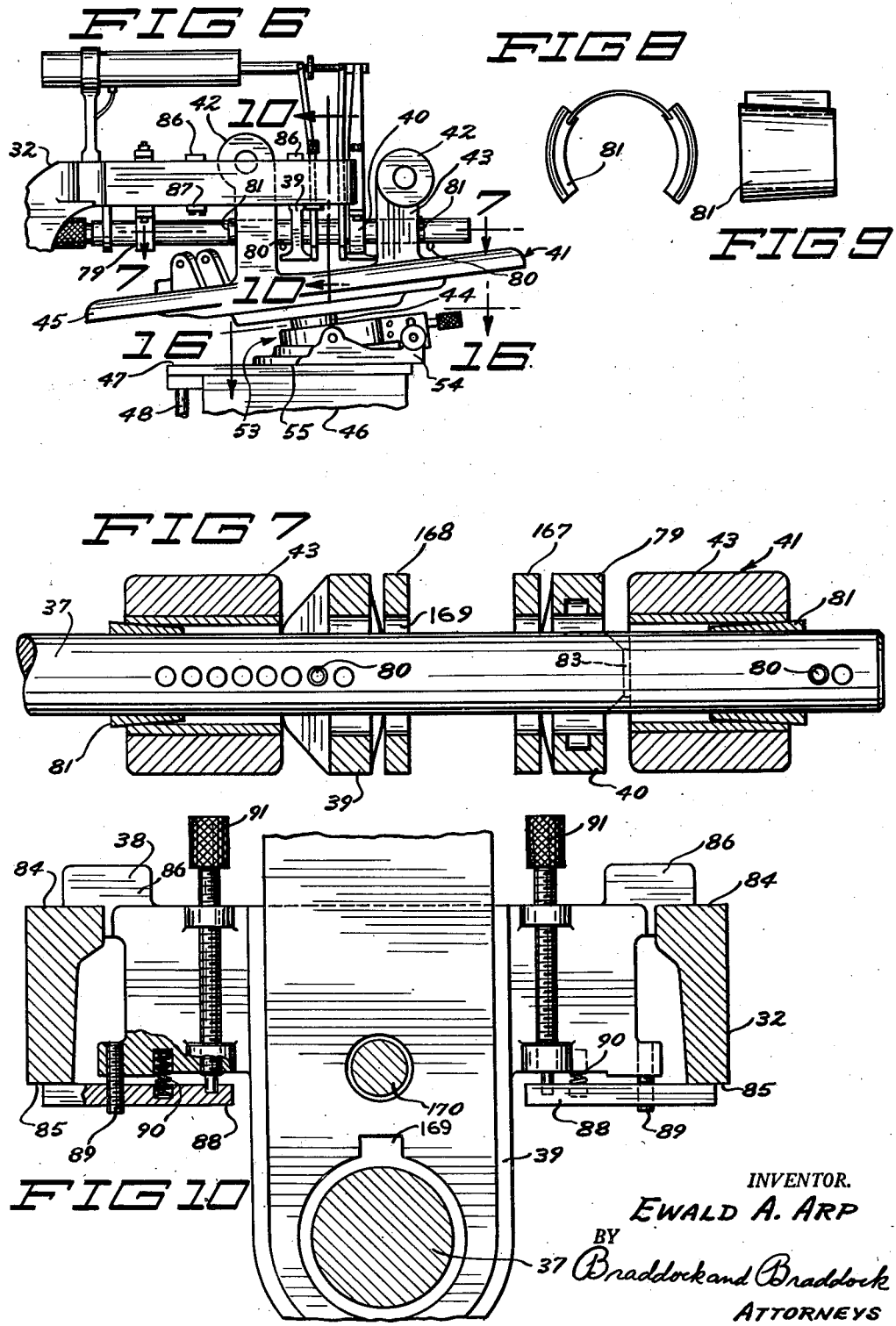

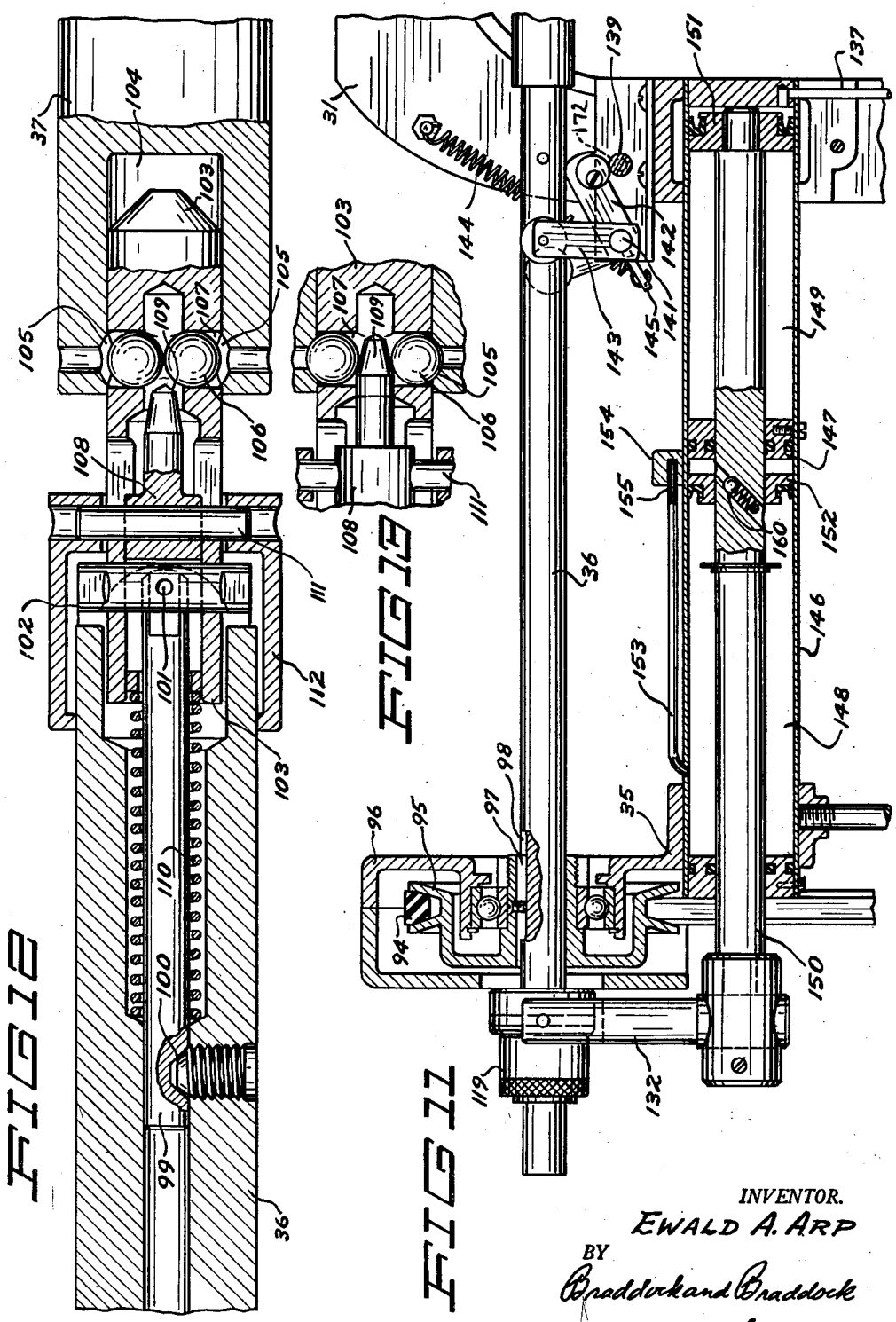

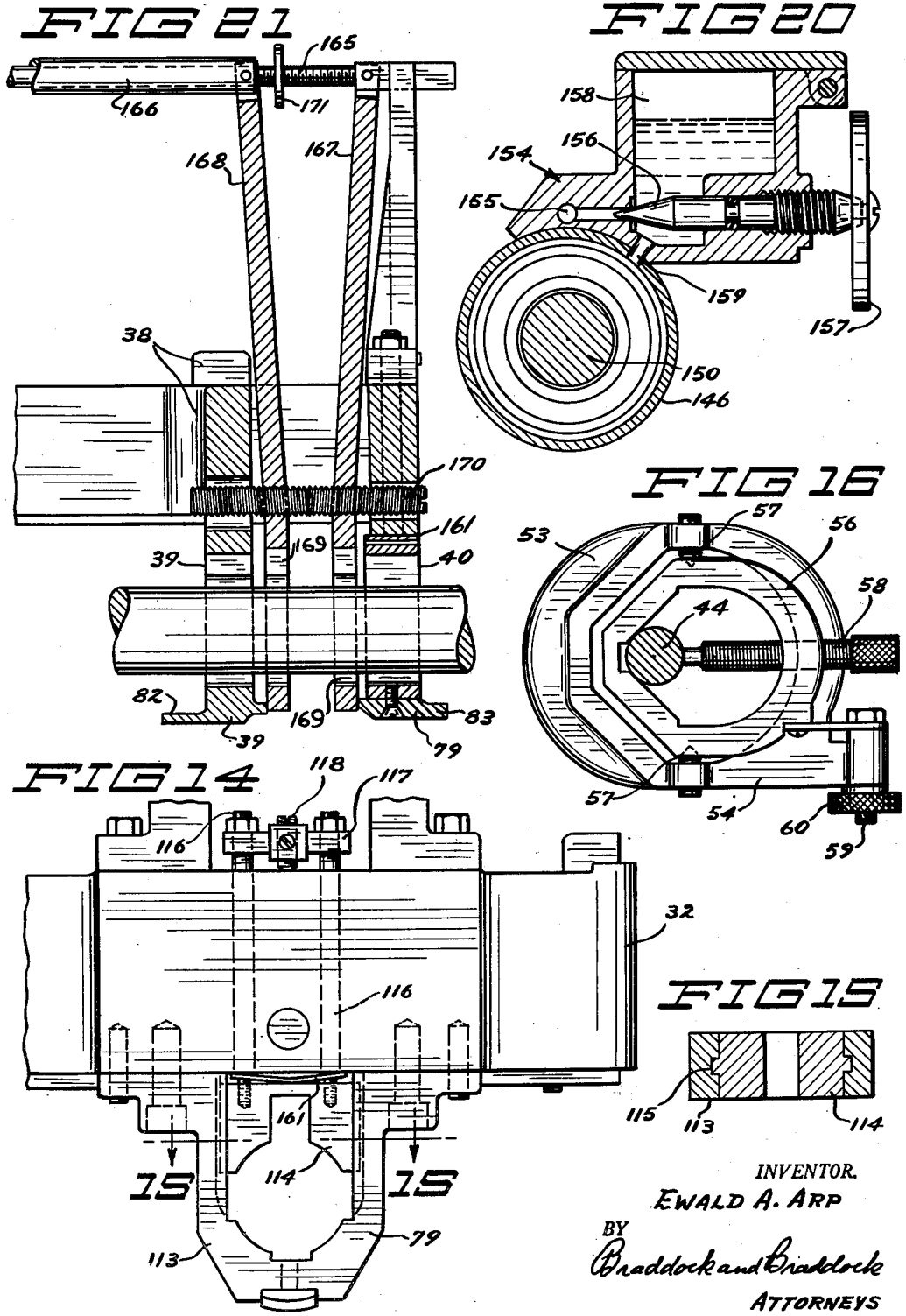

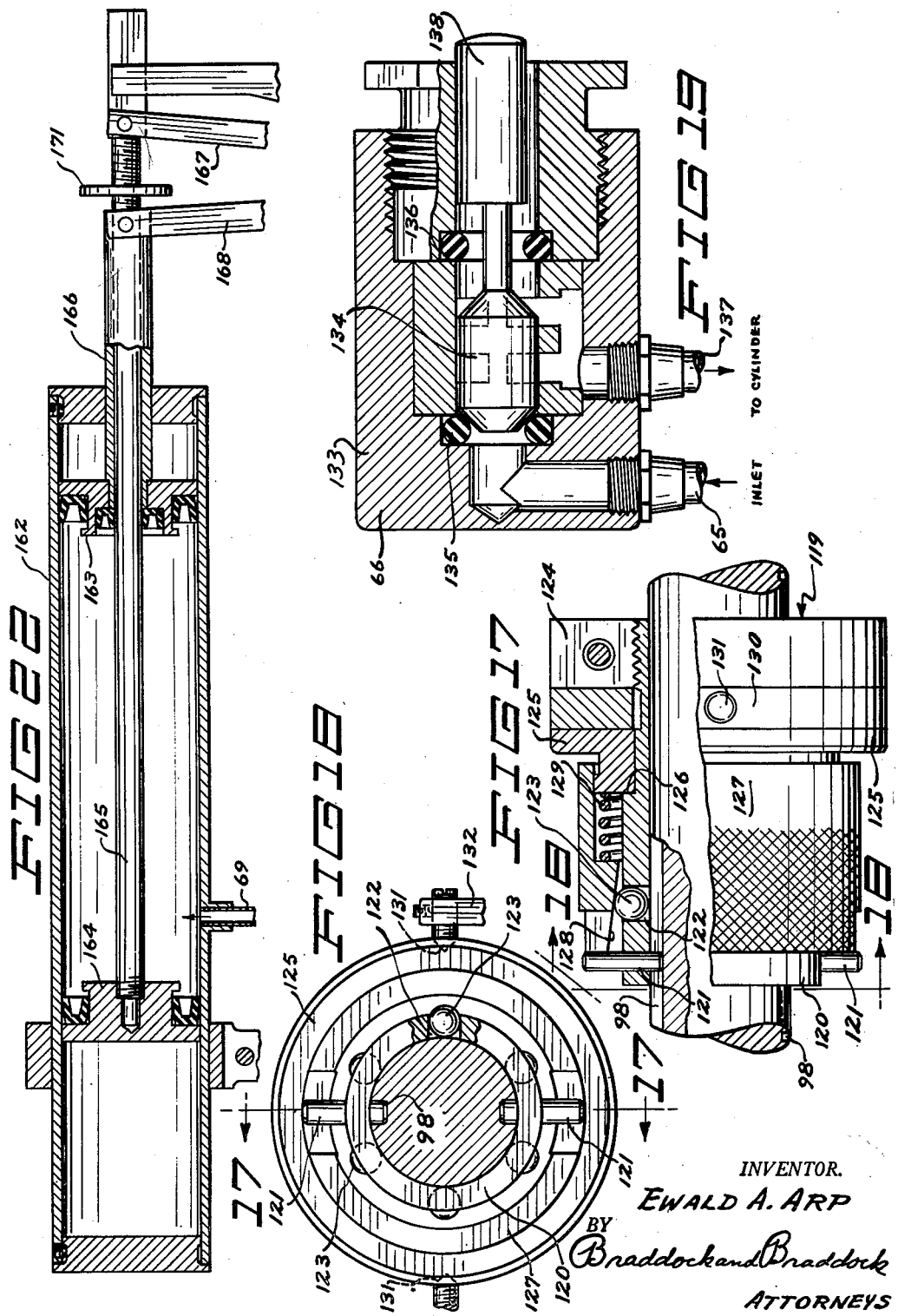

2,632,341

UNITED STATES PATENT OFFICE 2,632,341

MACHINE FOR BORING BEARINGS

Ewald A. Arp, Minneapolis, Minn., assignor to Tobin-Arp Manufacturing Company, Minneapolis, Minn., a corporation of Minnesota Application December 10, 1951, Serial No. 260,855

23 Claims. (Cl. 77—3)

This invention presents a machine which is particularly useful in reboring king pin bearings on front wheel spindle assemblies of automotive vehicles. The machine is adapted to perform the boring operation without removing the circular brake plate from the bearing casting.

In order to be useful over a wide range of sizes and shapes of front wheel spindle assemblies, the machine embodies novel means for supporting the casting to be bored, alining the bearings with a boring bar of the machine, and clamping and holding the casting in place during the boring operation. In order to be adapted to accomplish the aforesaid operations, a number of novel features have been incorporated into the machine and the necessary elements thereof.

In the drawings which accompany this specification and form a part thereof,

Fig. 1 is a front elevational view of a boring machine of the invention with parts of a casing of the machine broken away and with the position of a typical front wheel spindle assembly to be bored shown in dotted lines;

Fig. 2 is a top plan view of the machine;

Fig. 3 is an end elevational view of the machine as seen from the right of Fig. 2;

Fig. 4 is an enlarged detail view in vertical section of lifting mechanism of the elevator for the front wheel spindle assembly;

Fig. 5 is an enlarged detail sectional view taken on the line 5—5 in Fig. 4;

Fig. 6 is a fragmentary view of the machine as seen in Fig. 1 with a typical front wheel spindle assembly shown in position to be bored;

Fig. 7 is an enlarged horizontal sectional view taken on the line 7—7 in Fig. 6;

Fig. 8 is an end view of the centering cone disclosed in Fig. 7;

Fig. 9 is a side elevational view of the centering cone;

Fig. 10 is an enlarged vertical view taken on the line 10—10 in Fig. 6;

Fig. 11 is an enlarged vertical sectional view taken on the line 11—11 in Fig. 2;

Fig. 12 is a vertical sectional view showing the clutch for securing the driving bar and the boring bar to each other;

Fig. 13 is a fragmentary view showing a portion of the parts shown in Fig. 12 in the clutched position;

Fig. 14 is an enlarged detail view of a portion of the machine as seen in Fig. 3;

Fig. 15 is a horizontal view taken on the line 15—15 in Fig. 14;

Fig. 16 is a top plan view of a spindle clamping jig for the front wheel spindle assembly taken on the line 16—16 in Fig. 6;

Fig. 17 is an enlarged detail view of the feed clutch as seen in Fig. 11 with parts broken away along the line 17—17 in Fig. 18;

Fig. 18 is a vertical sectional view taken on the line 18—18 in Fig. 17;

Fig. 19 is an enlarged vertical sectional view taken on the line 19—19 in Fig. 2;

Fig. 20 is a vertical sectional view taken on the line 20—20 in Fig. 2;

Fig. 21 is a vertical view taken on the line 21—21 in Fig. 3; and

Fig. 22 is an enlarged vertical sectional view taken on the line 22—22 in Fig. 2.

A boring machine 30 includes a base 31 and a generally L-shaped main frame 32 mounted thereon. The base 31 includes a casing 33 with an access door 34. A driving head mechanism 35 is supported on the base 31 and on the main frame 32. A driving bar 36 is supported in the driving head mechanism and a boring bar 37, alined with the driving bar and coupled thereto, is supported by bearings provided in the main frame 32. A slide 38 on an upper horizontal portion of the main frame carries a movable vertical clamping element 39. A stationary vertical clamping element 40 is carried by the frame 32.

A typical front wheel spindle assembly 41 is illustrated in position to be bored in Fig. 6, is shown in dotted lines in Fig. 1, and has the outer limits thereof indicated by a dotted line in Fig. 2. Projecting arms 42—42 of a bearing casting 43 of the front wheel spindle assembly 41 contain a pair of alined bearings which are used to receive the king pin of an automobile and thereby cause the entire front wheel to be supported on the automobile. When these bearings become worn, it is necessary that they be replaced and bored in perfect alinement with each other for a new king pin. A spindle 44 for supporting the front wheel projects outwardly from the bearing casting 43. In order that the characteristics of the front wheel suspension of the car will cause the steering wheel to become centered and the car to travel in a straight line when the steering wheel is released, the axis of the bearings of the front wheel spindle assembly must not be at right angles to the axis of the spindle. The circular brake plate 45 is bolted securely to the bearing casting 43. As will best be seen in Figs. 1 and 6, the outer rim of this plate approaches very closely to the extended outer diameter of the king pin bearings. For this reason, it is impossible to bore these bearings using conventional equipment.

For clarity in description, the front wheel spindle assembly 41 will hereafter often be referred to as the work to be bored or simply as the work 41.

In order to utilize the boring machine of the present invention in reboring the two bearings of the work, it is first necessary that the work be positioned so that the bearings to be rebored are exactly concentric with the boring bar of the machine. To do this, an elevator 46 is employed. This elevator has a flat upper supporting surface 47 parallel to the axis of the boring bar and a pair of stabilizing rods 48—48 supported in bearings 49—49 bracketed to the base 31. The lifting mechanism for the elevator 46 consists of a cylinder 50, a piston 51 in the cylinder and a lift rod 52 connected to the piston and to the elevator.

A spindle clamping jig 53 is for supporting the work so that the axis of the bearing to be bored will lie in a plane parallel to the plane of the supporting surface 47 of the elevator 46. A jig base member 54 has a bottom side thereof 55 adapted to rest in contact with the upper surface 47. A jig ring 56 is pivoted to the jig base 54 at 57—57. A jig screw clamp 58 is operably supported in said jig ring 56 to clamp the spindle 44 of the work as best seen in Fig. 16. The threaded and headed bolt 59 and the knurled nut 60 are for clamping the jig ring with respect to the jig base when the axis of the bearings to be bored is parallel with the top surface 47 of the elevator.

Front wheel assemblies come in a very wide variety of sizes and shapes. In order to function for the purpose for which they are intended, however, there are certain elements which are essential and which are common to all. There must always be a spindle to support the front wheel. There must always be two alined bearings to support the king pin and the ends of these bearings which face each other must lie on a plane perpendicular to the axis of the bearings. By utilizing these elements, the machine of the present invention can be used to hold and clamp the front wheel spindle assembly in place during the boring operation. The movable clamping element 39 and the stationary clamping element 40 bear outwardly against the opposed parallel ends of the bearings of the work. The jig ring 56 and the jig screw clamp 58 act to rigidly position the spindle. Since the spindle clamping jig is supported against the plane surface 47 of the elevator, the axis of the bearings to be bored are prevented from moving out of a plane parallel to said elevator supporting surface and are prevented from any rotation. The movable clamping element 39 and the stationary clamping element 40 prevent any longitudinal movement along the axis of the bearings to be bored. Since longitudinal movement of the bearings, rotation thereof on their axis, and movement of the axis of the bearings out of a horizontal plane are all prevented, the bearings are supported properly for performing the boring operation.

The remainder of the specification will be concerned with the operation of the individual elements of the machine which are necessary to aline the bearings to be bored with respect to the boring bar, which cause the several clamping means to be applied and then held in place, and with the means which feed the boring bar longitudinally and cause it to be rotated.

The controls on the machine are located on the front of the casing 33. An air line 61 leads from a source of air under pressure (not shown) into the casing. This air line 61 opens to a first pressure control valve 62 and a second pressure control valve 63. These valves may be of any desired construction. A pressure gage 64 is for indicating the pressure on the outlet side of the first pressure control valve 62. An air line 65 runs from the outlet side of the first pressure control valve 62 to a cut-off valve 66 for controlling the longitudinal feed of the boring bar through the bearings to be bored. Details of this feed will be described in detail later in the specification. An air line 67 runs from the outlet side of the first pressure control valve 62 to a cut-off valve 68. An air line 69 extends from the outlet side of the cut-off valve 68 to the slide clamping mechanism and an air line 70 extends from an outlet side of the valve 68 to the elevator clamping mechanism.

An air line 71 extends from the outlet side of the second pressure control valve 63 to the interior of the cylinder 50 at a position between the end of said cylinder and the piston 51. An air bleed hole 72 is located in the wall of the cylinder 50 at a point between the lowest position of the piston 51 and the end of the cylinder. An inverted cylinder 73 is rigidly connected to and is concentric with lift rod 52. A sleeve 74 fits between the lift rod and the inverted cylinder. This sleeve is so constructed that it will slide on the lift rod and acts as an air seal between the rod and inverted cylinder. It has a conical camming surface 75 and is urged in upward direction on the lift rod by the spring 76 acting against the piston. Air line 70 opens into an upper portion of the inverted cylinder 73. A friction block 77 is connected by means of a flexible rod to the piston 51. A piston block wheel 78 is pivotally mounted in the friction block as best seen in Fig. 5.

When the second pressure control valve 63 is operated to allow air to pass into the air line 71, and into the cylinder between the piston and the end thereof, an upward force is exerted on the piston which will tend to cause the elevator to rise. The air under pressure entering the piston from line 71 will tend to pass out of the piston through the small air bleed hole 72. By increasing the amount of air pressure in the line 71, the amount of upward pressure against the piston 52 can be increased. By adjusting the second pressure control valve 63, a balance can be arrived at such that the force upward on the piston due to the air pressure is exactly equal to the force downward on the elevator due to the weight of the work, the elevator and the spindle clamping jig. Since air is continually passing out through the air bleed hole, this upward pressure on the piston will be a result of an equilibrium between the air coming into the piston and that going out and so for any particular value of air pressure entering the machine and for any particular setting of valve 63, the pressure inside of the piston will be constant. When this point of balanced weight is reached, it is possible to manually position the elevator in any desired position and have it stay there.

When the elevator is in position to cause the bearings to be bored to be concentric with the boring bar, it is desirable to clamp the piston and the lift rod with respect to the cylinder. This is done by actuating the cut-off valve 68 to cause air under pressure to enter the line 70. This will cause the sleeve 74 to be forced downward toward the piston against the action of the spring 76 and will cause the conical camming surface 78 to be brought forcibly in contact with the friction block wheel 79. This forces the friction block 77 into firm contact with the cylinder 50. Only one such friction block and friction block wheel are shown but it is to be understood that any suitable number can be employed around the cylinder to bring about the firm and positive clamping action needed.

The boring bar 37 is supported to be freely rotatable and slidable in bearings 79—79 which are mounted on the horizontal upper portion of the main frame 32. A pair of tool bits 80—80 are fixedly secured in said boring bar at such position that they will make a cut of the desired radius. The manner of fixing these bits in the bar forms no part of the present invention.

Preparatory to boring the bearing with the boring bar and tool bits, it is necessary to position the work so that the unbored bearings will be exactly concentric with the boring bar. For this purpose, a pair of flexible cone shaped centering clips 81—81 are snapped over the boring bar at positions exterior of the two bearings to be bored. With the elevator lifting mechanism adjusted to exactly counterbalance the work and the elevator, and with the work positioned approximately as seen in Fig. 6, the centering clips are pushed toward each other until they rest in contact with the outer portion of the bearing surfaces of the work as best seen in Fig. 7. The movable vertical clamping element 39 has an outwardly extending contact lip 82 at a lower end thereof, and the stationary vertical clamping element 40 has an outwardly extending contact lip 83 on a lower portion thereof. The work and the centering clips 81—81 are moved along the boring bar 37 until the contact lip 83 is touching an inner end portion of one of the bearings to be bored. The work is now perfectly centered with respect to the boring bar. The slide 38 is then moved with respect to the main frame 32 so that the contact lip 82 is touching a lower inner end portion of the opposite bearing to be bored.

Upon movement of the cut-off valve 68 from the "off" to the "on" position, the work is firmly clamped in place. That is to say, the elevator piston 51 is firmly clamped with respect to the elevator cylinder 50 in the manner previously described and the contact lips 82 and 83 are forced in outward direction to firmly fix the position of the work with reference to longitudinal or other movement along the axis of the boring bar by means of mechanism which will be explained in detail later in the specification. The centering clips 81—81 can now be slid outwardly from the bearings to be bored and can be removed from the boring bar.

The horizontal upper portion of the main frame is provided with a pair of horizontal upper surfaces 84—84 at opposite sides thereof and a pair of horizontal lower surfaces 85—85 located below said horizontal upper surfaces. Four upper ears 86, each located at a corner of the slide 38 are for sliding over the horizontal upper surfaces 84 and for limiting the slide to movement in direction of the longitudinal axis of the boring bar. Two lower ears 87 are likewise integral projections from corners of the slide 38 and are positioned directly below the two upper ears which are nearest the drive head of the machine. Lower ears 87 slide in contact with the lower surfaces 85—85 of the main frame 32 and are for the purpose of resisting any tipping action which would tend to move the upper ears out of contact with the upper surfaces 84—84 of the main frame. A pair of slide tension bars 88—88 are pivotally mounted on the lower side of the slide in position beneath the two upper ears 86—86 which are farthest from the driving head. These slide bars pivot around the threaded bolts 89—89 by reason of the fact that the threads through the opening in the slide bars are slightly larger than the threads on the bolts. Springs 90—90 acting upon inner ends of the slide bars 88—88 cause the outer ends of said bars to be forced against the lower surfaces 85—85 of the main frame. The force exerted by the springs 90—90 will be sufficient to cause enough drag on the slide so that it will always remain firmly in place and will not slide along the axis of the boring bar except when this is intentional. Bolts 91—91 are threaded through portions of the slide 38 in such a manner that they can be manually turned down against the inner ends of the slide bars and thereby cause additional pressure to be brought by the outer ends of the slide bars against the main frame. When these bolts are manually tightened, the slide is fixedly locked with respect to the main frame. This action of the bolts and the pivoted slide bars serves as a safety measure for additionally locking the slide in place once the clamping action due to the air under pressure has been applied.

An electric motor 92 is mounted inside of the casing and is started and stopped by the electric switch 93. The motor drives the belt 94 which causes the pulley 95 to rotate about the driving bar 36 on a bearing which is mounted in drive head casing 96. The driving bar 36 is free to move along its axis through the pulley 95 but is keyed thereto to be rotated therewith by the key 97 riding in the driving bar keyway 98.

The clutch for securing the driving bar to the boring bar is illustrated in Figs. 12 and 13. A shaft 99 is fixedly secured inside the driving bar 36, as at 100. A first pivot pin 101 extends outwardly from opposite ends of said shaft 99 and a second pivot pin 102 having a slot therein to clear the flattened end of the shaft 99 is mounted on said first pivot pin. A circular shank 103 is pivotally mounted on said second pivot pin. This construction forms a universal joint for the circular shank 103 with respect to the driving bar. The shank is of shape to fit snugly into a hollowed portion 104 of the boring bar 37. This hollowed portion has indentations 105—105 which are of size and shape to accommodate a portion of metallic balls 106—106. An opening 107 through a central portion of the circular shank 103 is of diameter to accommodate the balls and said balls are positioned within the shank. Outer edges of the opening 107 are upset so that the balls will be retained therein. The circular shank 103 has been cut away to provide a series of cylindrical openings. A plunger 108 is positioned entirely within said circular shank and has a pointed end thereof of conical section designated 109. A spring 110 is positioned around the shaft 99 and urges the plunger 108 away from the driving bar 36. A connecting pin 111 is fixedly mounted in the plunger 108 and extends outwardly into a driving connector cover 112.

As seen in Fig. 12, the driving connector cover has been forced back along the driving bar thereby forcing the plunger back against the action of the spring 110 and pulling the end of the plunger away from the metallic balls. The shank 103 can then easily be inserted into or removed from the boring bar 37. In Fig. 13, the driving connector cover has been released and the plunger has been forced away from the driving bar by the spring 110. This causes the conical end portion of the plunger to force the metallic balls outward through the opening 107 and into the indentations 105—105 of the boring bar 37. In this position, the boring bar is firmly coupled to the driving bar, will rotate with the driving bar and will be moved longitudinally of its axis as the driving bar is so moved.

The driving bar is moved or fed longitudinally of its axis in direction away from the main frame by the feed mechanism which is best shown in Fig. 11. Details of the operation of this mechanism are presented later in this specification. The function of the mechanism is to feed the driving bar and boring bar to the left as seen in Fig. 11 at a uniform rate of speed and to allow the driving and boring bars to be moved to the right manually.

The bearings 79—79 are adjustable and each contacts the boring bar at four equally spaced positions around the periphery of the bar. The construction of one of said bearings is best shown in Fig. 14. The other bearing is similarly constructed. A bearing hanger 113 is fixedly mounted on a lower part of the horizontal upper portion of the main frame. A bearing shoe 114 is mounted in the bearing hanger 113 to be slidable in vertical direction. Tongue and groove construction indicated at 115 prevents other movement of the bearing shoe with respect to the bearing hanger. A pair of threaded bolts 116—116 are fixedly mounted in a top portion of said bearing shoe and extend upwardly through and beyond said main frame. A leaf spring 161 acts to urge said bearing shoe away from said main frame. An adjusting bar 117 is rigidly attached to the ends of the bolts 116—116 at a position above the main frame. An adjusting screw 118 extends downwardly through said adjusting bar to contact an upper surface of said main frame. The bearing shoe 114 is so positioned that it will exert enough downward force on the boring bar when it is in position in the bearing to properly support the bar during the boring operation but will not exert so much force as to interfere with the action of the machine due to excessive friction. This adjustment is made by tightening the adjusting screw 118 to cause the bolts 116—116 to be forced upward by the action of the adjusting screw on the top surface of the main frame and the adjusting bar on the upper portions of the bolts. This will cause the bearing shoe to be adjusted upward against the action of the leaf spring 161. This construction prevents the possibility of the boring bar "freezing" in the machine due to excessive heating of the bearing since expansion in the size of the bar due to excessive heating will simply force the bearing shoe up away from the bearing and will automatically provide the additional clearance needed.

In order that the feed mechanism can cause the driving bar and boring bar to move in longitudinal direction away from the main frame of the machine, it is necessary that a feed clutch 119 be provided which will have portions thereof firmly clutched to the driving bar to withstand longitudinal pressure and other portions thereof which will rotate freely with respect to the rotating driving bar. This feed clutch is best shown in Figs. 17 and 18. An inner sleeve 120 has an inner diameter equal to the diameter of the driving bar and is concentric with the driving bar. A pair of pins 121—121 extends through the sleeve into the keyways 98. A series of openings 122 of the same diameter as that of metallic balls 123 extend radially through the sleeve. A split collar 124 is fastened to an outer portion of the inner sleeve at the end of the feed clutch nearest the driving head. A solid collar 125 is fixedly mounted on said sleeve at a central portion thereof and bears against a shoulder 126 of the sleeve 120. An outer sleeve 127 is slidably mounted on an outer portion of said solid collar 125 and has an internal conical camming surface 128 at an end thereof opposite said solid collar. A spring 129 bearing on said solid collar 125 and said outer sleeve 127 urges the outer sleeve away from the solid collar. The metallic balls 123 are situated in the openings 122 in the inner sleeve 120. The action of the spring 129 on the outer sleeve 127 causes the camming surface 128 thereof to force the metallic balls firmly against the driving bar 36. This clamps the feed clutch to the driving bar in such a manner that it will withstand longitudinal thrust. A disc 130 is mounted between the split collar 124 and the solid collar 125 to be freely rotatable therein. A pair of indentations 131—131 are provided on opposite sides of the disc. A feed yoke 132 is pivotally mounted in these indentations.

The cut-off valve 66 is for controlling the supply of air under pressure which operates the feed mechanism. The details of this cut-off valve are best seen in Fig. 19. The air line 65 enters a rear portion of the main body 133 of the valve 66. A valve member 134 in said main body is constructed to have a valve seat contacting surface at each of two ends thereof. A valve seat 135 is located between said air line 65 and said valve member, and a valve seat 136 is located between said valve member and the outside of said valve 66. An air line 137 enters the main body 133 of the valve at a position between said valve seats 135 and 136. When air pressure exists in air line 65, the valve member 134 is forced away from the valve seat 135 and against the valve seat 136. This allows passage of air through the valve and out into the air line 137. An extension 138 of the valve member 134 passes through the opening of the valve seat 136 to a position outside the valve. When a force is applied to this valve member extension 138 to force the valve member away from the valve seat 136 and in contact with the valve seat 135, air in the air line 65 is cut off and there is a free passage for air from the air line 137 through opening in the valve seat 136 to the atmosphere outside the valve.

As shown in Fig. 2, the valve 66 is mounted on the vertical portion of the main frame. An actuator rod 139 is likewise mounted in the main frame and has one end thereof held in contact with extension 138 of the valve member and has a handle extending forwardly of the main frame at the opposite end thereof. A spring 140 on a collar fixed to the actuator rod urges the rod in direction toward the valve 66. A feed limit rod 141 is mounted on the main frame to be parallel to said actuator rod. This feed limit rod has a retaining arm 142 which is adapted to project into a notch 172 in the actuator rod to prevent the actuator rod from bearing against the valve member extension 138 after the actuator rod has been manually withdrawn from position holding valve member extension in the air supply cut-off position. A contacting arm 143 is fixedly mounted on said feed limit rod to be adjacent the driving bar. A spring 144 is connected to a spring arm of the feed limit rod to cause the retaining arm to be urged toward the actuator rod.

When it is desired that the driving bar and boring bar should be fed longitudinally, the handle of the actuator rod is manually pulled in a forward direction as seen in Fig. 2, the feed limit rod is rotated in direction to position the retaining arm in the notch 172 on the actuator rod and the actuator rod is then released. The retaining rod in said notch will prevent the actuator rod from being carried back to close off the air supply from air line 65 into the air line 137. This, as will be explained, causes the driving bar to move to the left as seen in Fig. 1. At this movement continues, the driving connector clutch cover 112 will come in contact with the contact arm 143. As the driving bar continues to move to the left, the contact arm will be forced by the cover 112 to cause the feed limit rod to rotate and so lift the retaining arm out of notch 172 on the actuator rod. The spring 140 will then cause the actuator rod to be moved against the valve member extension 138 and will cause the valve 66 to be closed and the feed of the driving bar to be stopped.

As will best be seen in Fig. 11, a feed cylinder 146 is mounted between the drive head mechanism and the main frame of the machine. A partition 147 separates an oil compartment 148 and an air compartment 149. A feed rod 150 extends from a position outside of the feed cylinder through the end wall of the cylinder, through the partition 147 and into the air compartment 149. This feed rod 150 is rigidly connected to the feed yoke 132 at its position outside of the feed cylinder. A first piston 151 is mounted at the end of said feed rod inside of said air compartment. Air line 137 from the cut-off valve 66 opens into said cylinder at position between the end thereof and the first piston 151. Introduction of air under pressure into air line 137 will cause the first piston 151 to be forced in direction toward the partition 147. As has been previously explained, when the air pressure in the line 137 is cut off, the air line is open to the atmosphere through the cut-off valve 66. In this condition, there is no build-up of air pressure between the piston and the end of the cylinder when the piston is moved in direction toward the right in Fig. 11.

A second piston 152 is located in the oil compartment adjacent the partition 147 when the feed rod is in its limiting position in direction toward the right as seen in Fig. 11. An oil pipe 153 provides a passageway from the portion of the oil compartment on the left of the second piston as seen in Fig. 11 to an oil flow control valve 154. As the air pressure acting against the first piston 151 in the air compartment 149 causes the feed rod 150 to move to the left, that portion of the oil compartment to the left of piston 152 is put under pressure. This forces the oil up into the oil pipe 153 and into the oil flow control valve 154. Oil from the oil pipe 153 enters the control valve 154 at 155. A needle valve 156 having a calibrated handle 157 is so constructed as to be able to close the opening from the oil pipe 153 into an oil reservoir 158. An opening between the oil reservoir and that portion of the oil compartment to the right of the second piston as seen in Fig. 11 is designated 159.

When the feed rod is being forced to the left, its rate of progress in that direction can be controlled by adjusting the size of the opening for oil to pass from the left side of the second piston, past the needle valve, into the reservoir and into the right hand side of the piston. Should any air enter the air compartment 149, it will go to the top and be forced through the oil pipe 153 and upon arriving at the reservoir 158 will rise to the surface and enter the atmosphere.

The power feed of the machine is always to the left as seen in Fig. 11. When it is desired to reposition the driving bar and the boring bar to the right, the feed yoke and the feed rod are manually moved in that direction. In order to allow rapid movement of oil from the right of the piston 152 to the left thereof, a ball check valve 160 is provided. This valve is of construction to have a metallic ball in place against a valve seat in the interior of the valve passage in the feed rod 150. A spring yieldably holds the ball in place except when oil is being forced through the valve passage when the feed rod is being moved from left to right.

The mechanism for clamping the slide 38 in place when air under pressure is introduced into the air line 69 by the operation of the cut-off valve 68 includes a slide clamp cylinder 162 mounted on the main frame 32 to have its axis directly above and parallel to the axis of the boring bar. A right hand piston 163 and a left hand piston 164 are situated inside of the cylinder 162. The air line 69 opens to the inside of the cylinder at a position between the two pistons. A piston rod 165 is connected to the piston 164 and extends through the right hand piston and end wall of the cylinder 162. A piston rod sleeve 166 is connected to the right hand piston 163, is concentric with piston rod 165 and extends through the end wall of the cylinder. A first lever arm 167 is pivotally connected to an outer end of the piston rod 165 and extends downwardly therefrom and a second lever arm 168 is pivotally connected to the piston rod sleeve 166 and extends downwardly therefrom. The first and second lever arms extend to position adjacent the bottom of movable vertical clamping element 39 and stationary vertical clamping element 40. They are each provided with openings 169—169 to allow unimpeded passage of the boring bar and tool bit therethrough. An adjustable pivot rod 170 extends through each of the lever arms and is constituted as a screw bolt having left and right hand threads at opposite ends thereof. The first and second lever arms are tapped with threads slightly larger than the threads on the adjustable pivot rod so that each lever arm can pivot about the pivot rod. The bottom end of the first lever arm 167 is positioned to contact a bottom portion of the stationary clamping element 40 at a side thereof opposite the lip 83. Before air is introduced into the air line 69 and into the cylinder 162, the adjustable pivot rod is rotated to cause the first and second lever arms to be moved with relation to each other so that the lower portion of the second lever arm will come in contact with a lower portion of the vertical movable clamping element 39 at a side thereof opposite the lip 82.

When the adjustable pivot rod has been set to cause the bottom portions of the lever arms to be in contact with their respective vertical elements, and when the work has been positioned to be in proper alinement with the axis of the boring bar, the cut-off valve 68 is operated to cause air under pressure to enter the air line 69 and consequently to enter the slide clamp cylinder 162. This will cause the pistons 163 and 164 to be forced away from each other and will cause the upper parts of the lever arms 167 and 168 to be forced toward each other. As both of these arms pivot about the adjustable pivot rod 170, the lower ends of the arms will be forced away from each other and will bring pressure to bear upon the vertical clamping elements 39 and 40. Since the pistons 163 and 164 are free to move independently of each other in the cylinder 162, the force exerted by each of the lever arms on its respective clamping element will be equal to the force exerted by the other arm.

An outer portion of the piston rod 165 is threaded and a tapped disc 171 is mounted thereon. This tapped disc 171 is so positioned that the movement of the upper parts of the lever arm toward each other will be limited to prevent damage to the threads in the lever arms and the threads on the adjustable rod 170 in the event that the vertical clamping elements slide too far outward with respect to each other. This could happen if the cut-off valve 68 was inadvertently operated before the vertical clamping elements were confined between two bearings to be bored in a front wheel spindle assembly.

In operation, the spindle of the work is first firmly clamped in place in the spindle clamping jig 53. The bottom surface 55 of the base of said jig is placed in contact with the upper supporting surface 47 of the elevator. The knurled nut 60 and bolt 59 are loosened so that the jig ring can pivot freely with respect to the jig base. The second air pressure control valve 63 is operated until the elevator 46 starts to rise. When the work is elevated so that the bearings to be bored are approximately at the height of the boring bar, the second valve 63 is so adjusted that the elevator will remain in its position. The work and the spindle clamping jig are moved with respect to the top surface of the elevator so that the axis of the bearings to be bored is approximately alined with the axis of the boring bar bearings. The boring bar, which is at this stage disconnected from the driving bar, is positioned between the driving head and the main frame and is slid through the bearings which support it and through the bearings to be bored. Centering clips 81—81 are clipped over the boring bar at positions immediately adjacent the bearings to be bored. The centering clips are pushed toward the bearings to be bored and the work is moved until the centering clips are firmly in contact inside of each of the bearings to be bored. The boring bar, work, and centering clips are moved along the axis of the boring bar until the stationary clamping element 40 is in contact with an inner surface of one of the bearings to be bored. The movable vertical clamping element 39 is moved to the left as seen in Fig. 6 until it is in contact with the inner surface of the other bearing to be bored. The cut-off valve is operated to cause air pressure to be exerted in the slide clamp cylinder 162 and in the inverted cylinder 73 of the elevator clamping mechanism. Knurled bolts 91—91 are turned down tight to further clamp the slide with respect to the main frame. Knurled nut 60 is tightened on the clamping jig 53. Centering clips 81—81 are moved outward away from the bearings to be bored and are unclipped from the boring bar.

Assuming that the tool bits 80 have already been fixed in the boring bar at the proper radius for boring, the boring bar is slid to position so that the bits are immediately to the right of the bearings to be bored as seen in Fig. 7. The driving bar is coupled to the boring bar in the manner which has been made plain. The feed yoke 132 is manually moved to its limiting position in the right hand direction as seen in Fig. 1 and the feed clutch 119 is moved to position adjacent the feed yoke. Needle valve 156 is adjusted at the proper setting to provide the desired rate of feed. The electric motor 92 is put into operation by actuation of the electric switch 93 and the driving bar and boring bar are thus caused to rotate. Actuator rod 139 is moved away from the cut-off valve 66 to cause the boring bar to be fed to the left in the manner which has been described. Retaining arm 142 prevents actuator rod 139 from causing the valve 66 to be shut off until the tool bits bore through the worn bearings of the work. At this point the driving connector cover will come in contact with the contact arm 143 and will cause the cut-off valve 66 to be closed in the manner previously described. This stops the longitudinal feed of the boring bar and the motor can be turned off. The boring bar and driving bar are moved to the left so that the boring bar will be clear of the bearings which have now been bored. The knurled bolts 91—91 are loosened and the cut-off valve 68 operated to cut off flow of air to the slide and elevator clamping mechanisms. Pressure control valve 63 is closed to cause the work and the elevator to be lowered. The spindle is released from the spindle clamping jig to complete the sequence of operations.

What is claimed is:

1. A machine for boring a pair of spaced apart bearings having a common axis and both being integral with parts of the same casting comprising a frame, means for fixedly positioning said casting with respect to said frame, means for applying force to one face of one of said bearings in direction parallel to the axis of said bearings, means for resisting said force at an opposite face of the other of said pair of bearings, a boring bar, means for supporting said boring bar on said frame including a stationary bearing hanger contacting said boring bar at a lower portion of the circumference thereof and a slidably mounted bearing shoe spring pressed in direction toward said bearing hanger and contacting said boring bar at an upper portion of the circumference thereof, tool bits in said boring bar, means for causing said boring bar to rotate, and means for causing said boring bar to be fed longitudinally of its axis.

2. A machine for boring a pair of spaced apart bearings having a common axis and both being integral with parts of the same casting, comprising a base, a frame on said base, a boring bar horizontally mounted in said frame, tool bits in said boring bar, first means for causing said boring bar to be rotated, second means for causing said boring bar to be fed longitudinally of its axis, third means operative on operation of said second means to stop longitudinal feed of said boring bar when said tool bits approach parts of said machine, fourth means to support said casting to have the axis of said bearings lying in a horizontal plane, fifth means for positioning said casting so that said horizontal plane will coincide with the axis of the boring bar, sixth means for positioning said casting to have the axis of said bearings coincide with the axis of said boring bar, and seventh means for applying force in outward direction parallel to the axis of said bearings and said boring bar to inner edges of said pair of bearings.

3. A machine for boring a pair of spaced apart bearings having a common axis and being integral with a casting, comprising a frame, a boring bar horizontally mounted to be rotatable and slidable in said frame, tool bits in said boring bar, means for causing said boring bar to be rotated, means for causing said boring bar to be fed longitudinally of said bearings, and means for holding said casting in position to have said axis of said bearings coincide with the axis of said boring bar including a first vertical clamping element fixedly supported on said frame and being adapted to come in contact with an edge of a first of said bearings, a second vertical clamping element slidable with respect to said frame and adapted to come in contact with a second of said bearings at an edge surface thereof, mechanism for forcing said second vertical clamping element in direction away from said first vertical clamping element, a jig providing a supporting surface adapted to be clamped to the casting to have said supporting surface parallel to the axis of said bearings, and an elevator adjustably mounted with respect to said boring bar providing a horizontal surface for receiving said supporting surface of said jig.

4. A machine for boring a pair of spaced apart bearings having the same axis and being integral parts of the same casting comprising a frame, a boring bar horizontally mounted on said frame, tool bits in said boring bar, a motor operably connected to said boring bar to effect rotation thereof, piston operated, hydraulically controlled means for causing said boring bar to be fed longitudinally of its axis; means for utilizing longitudinal movement of said boring bar for interrupting the action of said piston operated means to stop said longitudinal feed when said tool bits approach parts of said machine, a jig and an elevator platform for supporting said casting to have the axis of said bearings lying in a horizontal plane, elevator lifting means for positioning said horizontal axis of said bearings to lie in a horizontal plane passed through the axis of said boring bar, centering clips for positioning said casting so that the axis of said bearings will coincide with the axis of said boring bar, and slide clamping means including a pair of piston operated lever arms for applying force to inner faces of said bearings in outward direction parallel to the axis thereof.

5. A machine for boring a pair of spaced apart bearings having the same axis and both being integral parts of the same casting, comprising a base, a frame on said base, a boring bar horizontally mounted on said frame, tool bits on said boring bar, means for causing said boring bar to be rotated, means for causing said boring bar to be fed longitudinally of its axis, an elevator supported in said base for vertical movement with respect thereto and providing a flat horizontal supporting surface at the top of said elevator, a vertical elevator lifting cylinder, an elevator lift rod having one end thereof connected to said elevator and another end extending into said vertical cylinder, an elevator lifting piston in said vertical cylinder connected to said lift rod, said vertical cylinder being provided with an air bleed hole between said elevator lifting piston and a closed end of said vertical cylinder, a first air line open to said vertical cylinder between said lifting piston and said closed end of said vertical cylinder, an inverted cylinder concentric with and integral with said lift rod, a sleeve on said lift rod and in said inverted cylinder having a conical camming surface at a lower portion thereof and being adapted to form an air seal between said lift rod and said inverted cylinder, a spring between said lifting piston and said sleeve for urging said sleeve away from said piston, a second air line open to said inverted cylinder between a closed end thereof and said sleeve, a friction block supported on said lifting piston adapted to be forced against a wall of said vertical cylinder by said conical camming surface when said sleeve is forced toward said lifting piston against the action of said spring, a first vertical clamping element fixedly supported on said frame and adapted to come in contact with an inner edge surface of a first of said bearings, a second vertical clamping element slidable with respect to said frame and adapted to come in contact with an inner edge of a second of said bearings, first and second lever arms adapted to make contact with portions of said first and second vertical clamping elements, an adjustable pivot rod threadably mounted in each of said first and second lever arms to provide pivot points for said arms, a horizontally mounted slide clamp cylinder supported on said frame to have its axis parallel to the axis of said boring bar, first and second slide clamp pistons in said slide clamp cylinder, a slide clamp piston rod fixedly mounted on said first slide clamp piston, extending through said second piston and being pivotally mounted on said first lever arm, a slide clamp piston rod sleeve fixedly mounted in said second piston, concentric with and surrounding said slide clamp piston rod, and being pivotally mounted on said second lever arm, a third air line open to said slide clamp cylinder between said first and second slide clamp pistons, a clamping jig providing a flat supporting surface adapted to be clamped to the casting to fix said flat surface in a plane parallel to the axis of said bearings, a pair of cone shaped centering clips each having an inner diameter equal to the diameter of said boring bar and an outer diameter varying from greater than to lesser than the diameter of the bearings and adapted to be positioned concentric with said boring bar and in contact with an inner surface of said bearings, a pressure control valve between said first air line and a source of air under pressure for controlling the rate of flow of air into said first air line, and a first cut-off valve between a source of air under pressure and said second and third air lines for selectively closing and opening said second and third air lines to said source of air under pressure.

6. A machine for boring a pair of spaced apart bearings having a common axis and both being integral parts of the same casting, comprising a base, a frame on said base, a boring bar horizontally mounted in said frame, tool bits in said boring bar, a driving bar mounted on said base to have its axis coincide with the axis of the boring bar, a driving clutch for detachably securing the boring bar to the driving bar, a feed clutch on said driving bar adapted to releasably grip said driving bar to withstand a force in longitudinal direction along said bar and having a disc supported to be fixed longitudinally of said driving bar and to be freely rotatable with respect to said feed clutch, a feed yoke attached to said disc, a horizontal rod parallel to said driving bar and connected to said feed yoke, a feed cylinder concentric with said feed rod, a partition in a central portion of said feed cylinder having an opening therethrough to permit passage of said feed rod and separating said cylinder to provide an oil compartment and an air compartment therein, a first feed piston fixedly mounted on said feed rod in said air compartment, a first air line open to said air compartment at a side of said first feed piston opposite said oil compartment, a second piston fixedly mounted on said feed rod in said oil compartment, an oil pipe opening from a position inside said oil compartment on a first side of said second feed piston to a position inside said oil compartment on a second side of said piston, an oil flow control valve for adjustably controlling the flow of oil through said oil pipe, a pulley keyed to rotate with said driving bar and free to slide longitudinally with respect thereto, an electric motor, a belt operably connecting said electric motor and said pulley, an elevator supported in said base for vertical movement with respect thereto and providing a flat horizontal supporting surface at the top thereof, a vertical elevator lifting cylinder, an elevator lift rod having one end thereof connected to said elevator and another end thereof extending into said vertical cylinder, an elevator lifting piston in said vertical cylinder connected to said lift rod, said vertical cylinder being provided with an air bleed hole between said elevator lifting piston and a closed end of said vertical cylinder, a second air line open to said vertical cylinder between said lifting piston and said closed end of said vertical cylinder, an inverted cylinder concentric with and integral with said lift rod, a sleeve on said lift rod and in said inverted cylinder having a conical camming surface at a lower portion thereof and being adapted to form an air seal between said lifting rod and said inverted cylinder, a spring between said lifting piston and said sleeve for urging said sleeve in direction away from said vertical piston, a third air line open to said inverted cylinder between a closed end thereof and said sleeve, a friction block supported on said lifting piston adapted to be forced against the wall of said vertical cylinder by said conical camming surface when said sleeve is forced in direction toward said lifting piston against the action of said spring, a first vertical clamping element fixedly supported on said frame and adapted to come in contact with an inner edge surface of a first of said bearings to be bored, a second vertical clamping element slidable with respect to said frame and adapted to come in contact with an inner edge of a second of said bearings, first and second lever arms adapted to make contact with portions of said first and second vertical clamping elements, an adjustable pivot rod threadably mounted in each of said first and second lever arms to provide a pivot point for said arms, a horizontally mounted slide clamp cylinder supported on said frame to have its axis parallel to the axis of said boring bar, first and second slide clamp pistons in said slide clamp cylinder, a slide clamp piston rod fixedly mounted on said first slide clamp piston, extending through said second piston and being pivotally mounted to said first lever arm, a slide clamp piston rod sleeve fixedly mounted in said second piston, concentric with and surrounding said slide clamp piston rod, extending through said outer end of said slide clamp cylinder and being pivotally mounted to said second lever arm, a fourth air line open to said slide clamp cylinder between said first and second slide clamp pistons, a clamping jig providing a flat supporting surface adapted to be clamped to the casting to fix said flat surface in a plane parallel to the axis of said bearings to be bored, a pair of cone shaped centering clips each having an inner diameter equal to the diameter of said boring bar and an outer diameter varying from greater than to lesser than the diameter of the bearings to be bored and each adapted to be positioned concentric with said boring bar and in contact with an inner surface of one of said bearings to be bored, a pressure control valve between said second air line and a source of air under pressure for controlling the rate of flow of air into said second air line, a first cut-off valve between a source of air under pressure and said third and fourth air lines for selectively closing and opening said third and fourth air lines to said source of air under pressure, a second cut-off valve between said first air line and a source of air under pressure adapted to be positioned in open position to cause said first air line to be open to source of air under pressure and to closed position to cause said first air line to be open to atmosphere, spring operated means for maintaining said second cut-off valve in open position, and means including a part of said drive clutch for causing said second cut-off valve to move from the open to closed position when said tool bits have moved to positions clear of said bearings.

7. In a machine for boring a pair of spaced apart bearings having the same axis and being integral parts of the same casting, the combination with a frame, a boring bar horizontally mounted on said frame, tool bits in said boring bar, means to effect rotation of said boring bar and mechanism for causing said boring bar to be fed longitudinally of its axis, of first means to support said casting to have the axis of said bearings lying in a horizontal plane, second means for positioning said casting to have said horizontal plane pass through the axis of said boring bar, third means for positioning said casting to have the axis of said bearings coincide with the axis of said boring bar, and fourth means for applying force to inner faces of said bearings in outward direction parallel to the axis thereof.

8. In a machine for boring a pair of spaced apart bearings having the same axis and being integral parts of the same casting, the combination with a frame, a boring bar horizontally mounted on said frame, tool bits in said boring bar, a motor operably connected to said boring bar to effect rotation thereof and means for causing said boring bar to be fed longitudinally of its axis, of a jig and an elevator platform for supporting said casting to have the axis of said bearings lying in a horizontal plane, elevator lifting means for positioning said horizontal plane of said axis of said bearings to pass through the axis of said boring bar, centering clips for positioning said casting to have the axis of said bearings coincide with the axis of said boring bar, and slide clamping means including a pair of piston operated lever arms for applying force to inner faces of said bearings in outward direction parallel to the axis thereof.

9. In a machine for boring a pair of spaced apart bearings having the same axis and both being integral parts of the same casting, the combination with a base, a frame mounted on said base, a boring bar horizontally mounted on said frame, tool bits on said boring bar, means for causing said boring bar to be rotated and means for causing said boring bar to be fed longitudinally of its axis, of an elevator supported in said base for vertical movement with respect thereto and providing a flat horizontal supporting surface at the top thereof, a vertical elevator lifting cylinder, an elevator lift rod having one end thereof connected to said elevator and another end extending into said vertical cylinder, an elevator lifting piston in said vertical cylinder connected to said elevator and said lift rod, said vertical cylinder being provided with an air bleed hole between said lifting piston and a closed end of said vertical cylinder, a first air line open to said vertical cylinder between said lifting piston and said closed end of said vertical cylinder, an inverted cylinder concentric with and integral with said lift rod, a sleeve on said lift rod and in said vertical cylinder having a conical camming surface at a lower portion thereof and being adapted to form an air seal between said lift rod and said inverted cylinder, a spring between said lifting piston and said sleeve for urging said sleeve away from said piston, a second air line open to said inverted cylinder between a closed end thereof and said sleeve, a friction block supported on said lifting piston adapted to be forced against a wall of said vertical cylinder by said conical camming surface when said sleeve is forced toward said lifting piston against the action of said spring, a first vertical clamping element fixedly supported on said frame and adapted to come in contact with an inner edge surface of a first of said bearings, a second vertical clamping element slidable with respect to said frame and adapted to come in contact with an inner edge of a second of said bearings, first and second lever arms adapted to make contact with portions of said first and second vertical clamping elements, an adjustable pivot rod threadably mounted in each of said first and second lever arms to provide pivot points for said arms, a horizontally mounted slide clamp cylinder supported on said frame to have its axis parallel to the axis of the boring bar, first and second slide clamp pistons in said slide clamp cylinder, a slide clamp piston rod fixedly mounted on said first slide clamp piston, extending through said second piston and being pivotally mounted on said first lever arm, a slide clamp piston rod sleeve fixedly mounted in said second piston, concentric with and surrounding said slide clamp piston rod, extending through said outer end of said slide clamp cylinder and being pivotally mounted to said second lever arm, a third air line open to said slide clamp cylinder between said first and second slide clamp pistons, a clamping jig providing a flat supporting surface adapted to be clamped to the casting to fix said flat surface in a plane parallel to the axis of said bearings, a pair of cone shaped centering clips each having an inner diameter equal to the diameter of said boring bar and an outer diameter varying from greater than to lesser than the diameter of the bearings and adapted to be positioned concentric with said boring bar and in contact with an inner surface of said bearings, a pressure control valve between said first air line and a source of air under pressure for controlling the rate of air flow into said first air line, and a first cut-off valve between a source of air under pressure and said second and third air lines for alternately closing and opening said second and third air lines to said source of air under pressure.

10. A device for holding a casting and a pair of spaced apart alined bearings having a common axis and being integrally connected to said casting comprising a frame, a first vertical clamping element fixedly supported on said frame and being adapted to come in contact with an edge surface of a first of said bearings between said bearings, a second vertical clamping element slidable with respect to said frame and adapted to come in contact with a second of said bearings at an edge surface of said bearing between said bearings, mechanism for forcing said second vertical clamping element in direction away from said first vertical element, a jig providing a flat supporting surface adapted to be clamped to the casting, and an elevator adjustably situated with respect to said frame providing a vertically movable horizontal surface adapted to receive said supporting surface of said jig.

11. In a machine of the character described, a device for clamping a pair of bearings in fixed position by exerting outward force on a pair of inner faces thereof comprising a cylinder, first and second pistons free to move in said cylinder, means for allowing entry of air under pressure to an area in said cylinder between said first and second pistons, a piston rod fixedly connected to said first piston, extending through said second piston and through a first end of said cylinder, a piston rod sleeve fixedly mounted in said second piston, concentric with said piston rod, in surrounding relation thereto and extending outwardly through said first end of said cylinder, a first lever arm pivotally connected to an end of said piston rod spaced from said first piston, a second lever arm pivotally connected to said piston rod sleeve at an end thereof opposite said second piston, an adjustable pivot rod having left and right hand threads operably mounted in said first and second lever arms, one of said lever arms being mounted on said adjustable pivot rod for pivoting action relative thereto in loose rocking contact with said right hand threads, and the other of said lever arms being mounted on said pivot rod for pivoting action relative thereto in loose rocking contact with said left hand threads.

12. In a machine of the character described, a device for supporting a weight on an elevator such that said weight and elevator can be moved manually up or down without appreciable effort, comprising a vertical cylinder beneath said elevator, a piston in said cylinder, a lift rod on said piston connected to said elevator, an air line for carrying air under pressure from a source thereof opening into said cylinder at position between a closed end thereof and said piston, a pressure control valve in said air line for regulating rate of flow of air under pressure in said line, and said cylinder being provided with an air bleed hole located in the wall thereof between said piston and said closed end thereof.

13. In a machine of the character described, a bearing assembly for supporting a removable shaft for rotation and longitudinal movement along its axis comprising a frame, a lower bearing hanger permanently mounted on said frame and adapted to contact said shaft on the circumference thereof over an arc of less than 180 degrees, an upper bearing shoe mounted to be slidable toward and away from said lower bearing hanger and adapted to contact said shaft on the circumference thereof over an arc of less than 180 degrees, a bolt permanently mounted in said upper bearing shoe and extending through said frame, a spring urging said upper bearing shoe in direction toward said lower bearing hanger and away from said frame, an adjusting bar permanently mounted on said bolt at an end thereof opposite said upper bearing shoe, an adjusting screw operably mounted in said adjusting bar to bear against the top of said frame to hold said bearing shoe against the action of said spring.

14. In a machine of the character described, a clutch for supporting a yoke for transmitting thrust longitudinally of a rotating shaft having a longitudinal keyway cut therein, comprising an inner sleeve rotatably and slidably mounted on said shaft and having a radial opening cut therethrough, a pin fixedly mounted in said sleeve and extending into said keyway, a disc rotatably mounted with respect to said inner sleeve and concentric with said shaft providing means for attaching said yoke thereto, a metallic ball in said radial opening, an outer sleeve slidable with respect to said inner sleeve and having an inner conical camming surface adjacent said metallic ball, and a spring forcing said outer sleeve in direction to cause said inner camming surface thereof to exert pressure on said metallic ball.

15. In a machine of the character described, a device for clutching a boring bar with a longitudinal opening in one end thereof and a driving bar to each other comprising a first shaft fixedly mounted in the interior of said driving bar, a circular shank adapted to fit said opening in said boring bar, being universally mounted with respect to said driving bar on said shaft and providing an opening therethrough in direction perpendicular to its longitudinal axis, a plunger slidably mounted in an opening in said shank concentric with its axis, said plunger having a cone shaped outer extension at an end thereof opposite said driving bar, a spring urging said plunger in direction away from said driving bar, a driving connector cover fixedly mounted with respect to said plunger through openings provided in said shank, a pair of circular cups integral with that portion of said boring bar extending around said shank, a pair of metallic balls in said shank opening perpendicular to said longitudinal axis thereof, said balls being adapted to be forced into fixed contact with said cups in said boring bar when forced away from the axis of said device by the action of said cone shaped outer extension of said plunger when said plunger is urged away from said driving bar by said spring and said shank is in position in said opening in the boring bar.

16. A machine for boring a pair of spaced apart, alined bearings in an integral rigid assembly including a boring bar, means for supporting said assembly to have the axis of said bearings coincident with the axis of said boring bar, means for applying force to edges of said bearings in direction parallel to the axis of said bearings to positively hold said assembly in fixed relationship to said boring bar, a tool bit in said boring bar, means for causing said boring bar to rotate, and means for causing said boring bar to be fed longitudinally of said bearing.

17. In a machine of the character described, a feed mechanism including a feed rod operably connected to apparatus to be fed, a feed cylinder concentric with said feed rod, a partition in a central portion of said feed cylinder having an opening therethrough to permit passage of said feed rod and separating said feed cylinder to provide an oil compartment and an air compartment therein, a first feed piston fixedly mounted on said feed rod in said air compartment, a first air line open to said air compartment at a side of said first feed piston opposite said oil compartment, a second piston fixedly mounted on said feed rod in said oil compartment, an oil pipe open from a position inside said oil compartment on a first side of said second piston to a position inside of said oil compartment on a second side of said second piston, and an oil flow control valve for adjustably controlling the flow of oil through said oil pipe.

18. The combination as specified in claim 17, a passageway for oil through said second piston, and a check valve in said passageway adapted to permit flow of oil along said passageway from a side of said second piston adjacent said air compartment to a side of said second piston opposite said air compartment and for preventing flow in the opposite direction.

19. A device for fixedly positioning a casting and a pair of spaced apart alined bearings having a common axis and being integrally connected to said casting comprising a frame, a first clamping element fixedly supported on said frame and being adapted to come in contact with an edge surface of a first of said bearings between said bearings, a second clamping element slidable with respect to said frame and adapted to come in contact with a second of said bearings at an edge surface of said bearing between said bearings, and mechanism for forcing said second clamping element in direction away from said first clamping element.

20. A device for holding a casting and a pair of spaced apart alined bearings having a common axis and being integrally connected to said casting comprising means to support said casting to prevent movement of the axis of said bearings out of a single plane, a fixedly positioned first clamping element adapted to come in contact with an edge surface of a first of said bearings, a second clamping element slidable with respect to said first clamping element and adapted to come in contact with a second of said bearings at an edge surface thereof, and means for applying force to said clamping element to tend to move said second clamping element with respect to said first clamping element.

21. A device for holding a casting and a pair of spaced apart alined bearings having a common axis and being integrally connected to said casting comprising means to support said casting to prevent movement of the axis of said bearings out of a single plane, a fixedly positioned first clamping element adapted to come in contact with an edge surface of a first of said bearings between said bearings, a second clamping element slidable with respect to said first clamping element and adapted to come in contact with a second of said bearings at an edge surface of said bearing between said bearings, and means for applying force to said second clamping element in direction away from said first clamping element.

22. In a machine of the character described, a device for fixing a piston and a piston rod connected thereto against longitudinal movement in an upright first cylinder including an inverted second cylinder concentric with and integral with said piston rod, a sleeve on said piston rod and in said inverted second cylinder having a conical camming surface at a lower portion thereof and being adapted to form an air seal between said piston rod and said inverted cylinder, a spring between said piston and said sleeve for urging said sleeve away from said piston, an air line open to the interior of said inverted cylinder between a closed end thereof and said sleeve, and a friction block supported on said piston adapted to be forced against the wall of said first cylinder by said conical camming surface when said sleeve is forced toward said piston against the action of said spring.

23. In a machine of the character described, a device for clutching a boring bar with a longitudinal opening in one end thereof and a driving bar to each other comprising a first shaft fixedly mounted in the interior of said driving bar, a circular shank adapted to fit said opening in said boring bar, said shank being mounted on said shaft, a plunger slidably mounted in an opening in said shank concentric with its axis, said plunger having a cone shaped outer extension at an end thereof opposite said driving bar, a spring urging said plunger in direction away from said driving bar, a driving connector cover fixedly mounted with respect to said plunger through openings provided in said shank, a circular cup integral with that portion of said boring bar adapted to extend around said shank, a metallic ball in said shank opening perpendicular to said longitudinal axis thereof, said ball being adapted to be forced into fixed contact with said cup in said boring bar when forced away from the axis of said device by the action of said cone shaped outer extension of said plunger when said plunger is urged away from said driving bar by said spring and said shank is in position in said opening in said boring bar.

EWALD A. ARP.

REFERENCES CITED

The following references are of record in the file of this patent:

UNITED STATES PATENTS

| Number | Name | Date |
| --- | --- | --- |
| 1,550,217 | McKenna | Aug. 18, 1925 |